United States Patent [19]

van der Horst

[11] 4,177,700

[45] Dec. 11, 1979

[54] TURNING MACHINE TOOL

[75] Inventor: Eberhard van der Horst, Erkelenz, Fed. Rep. of Germany

[73] Assignee: A. Monforts, Monchengladbach, Fed. Rep. of Germany

[21] Appl. No.: 900,111

[22] Filed: Apr. 26, 1978

[30] Foreign Application Priority Data

Apr. 26, 1977 [DE] Fed. Rep. of Germany ....... 2718479

[51] Int. Cl.² .......................... B23B 3/00; B23B 3/34
[52] U.S. Cl. ........................................... 82/2 R; 82/3
[58] Field of Search .............. 82/2 R, 2 B, 2 C, 2 D, 82/3

[56] References Cited

U.S. PATENT DOCUMENTS

| 3,974,721 | 8/1976 | Schalles et al. | 82/3 |
| 4,051,750 | 10/1977 | Berly | 82/2 R |
| 4,061,060 | 12/1977 | Trautmann | 82/3 |

FOREIGN PATENT DOCUMENTS

| 1193767 | 5/1965 | Fed. Rep. of Germany | 82/2 D |
| 1444301 | 7/1976 | United Kingdom | 82/2 R |

*Primary Examiner*—Harrison L. Hinson
*Attorney, Agent, or Firm*—Herbert L. Lerner

[57] ABSTRACT

Turning machine tool includes a workpiece spindle, a cantilevered longitudinal guide adjacent the workpiece spindle and movable parallel to the rotary axis thereof, at least one tool support mounted on the free end of the cantilevered longitudinal guide and being movable in a horizontal plane perpendicularly to the rotary axis of the workpiece spindle within a work space for the turning machine tool, guide means for the cantilevered longitudinal guide, and a round guide system which includes two transverse guides movable perpendicularly to the rotary axis of the workpiece spindle, the cantilevered longitudinal guide being supported outside the work space through the intermediary of the guide means in the round guide system.

14 Claims, 10 Drawing Figures

TURNING MACHINE TOOL

The invention relates to a turning machine tool, such as a lathe having at least one tool support mounted on the free end of a cantilevered longitudinal guide and movable parallel to the axis of rotation of the work piece spindle, the tool support also being shiftable in a horizontal plane perpendicularly to the axis of rotation of the workpiece spindle.

A turning machine tool of this type has become known heretofore from German Pat. DT-PS No. 1,285,836 wherein a turret lathe is disclosed, the turret of which being swingable with the shaft thereof into several operating positions as well as being shiftable axially for effecting an operating feed, and having one or more tool slides shiftable thereon transversely to the axis of rotation of the spindle. Accordingly, a transverse guide for the tool slide or slides is required on the turret, which is located within the work space of the machine tool and is therefore not only exposed to considerable soiling, but also impedes access to the work space, especially from the front side of the machine tool. Although in the aforementioned machine tool, the turret axis and the tool spindle are both mounted within the machine-tool housing, there is no force-wise connection between the two machine-tool elements that is close enough so that the forces occurring between the tool and the workpiece can be absorbed directly between the spindle and the turret shaft i.e. where they originate, as has been proposed heretofore, for example, in the German Published Non-Prosecuted Application DT-OS No. 2,630,248.

The combination of a longitudinally movable or traveling turret shaft and a slide movable or traveling transversely to the turret shaft or to the workpiece spindle represents a form of cross slide arrangement. Machine tools, in which the work piece spindle is associated with a tool support which can be moved or travel on a cross slide, are also called facing or face turning machines. In conventional machines of this general type, a cross slide with two crossed planar guides is provided which is arranged on a pedestal in the work space i.e. in front of the machine housing which carries the workpiece spindle. While in such machines, the work space and, therefore, the workpiece spindle, are usually adequately accessible, and the loading and unloading of workpieces can be accomplished relatively simply as compared to some turret lathes, the machines are expensive because, on the one hand, the forces acting between the workpiece spindle and the tool must be intercepted by means of an extremely stable machine frame, and on the other hand, the fabrication of the planar guides of the cross slide requires the expenditure of much energy and time.

It is accordingly an object of the invention to provide a turning machine tool of the foregoing type which does not have the disadvantages of the heretofore known machine tools and in which in particular, only round guides are to be used instead of planar guides which are at least partly used in current prior-art cross slides. It is another object of the invention to provide such a turning machine tool wherein the forces acting between the workpiece spindle and the tool are intercepted during the operation of the machine immediately or directly between these two structural parts, so that force fluxes acting through the frame and the housing of the turning machine tool and difficult to control, virtually do not occur.

With the foregoing and other objects in view, there is provided, in accordance with the invention, a turning machine tool comprising a workpiece spindle, a cantilevered longitudinal guide adjacent the workpiece spindle and movable parallel to the rotary axis thereof, at least one tool support mounted on the free end of the cantilevered longitudinal guide and being movable in a horizontal plane perpendicularly to the rotary axis of the workpiece spindle within a work space for the turning machine tool, guide means for the cantilevered longitudinal guide, and a round guide system comprising two transverse guides movable perpendicularly to the rotary axis of the workpiece spindle, the cantilevered longitudinal guide being supported outside the work space through the intermediary of the guide means in the round guide system.

What is achieved by the invention is, first, that, as desired, round guides can be used exclusively for the cross slide arrangement. What is further achieved is that the cross slide arrangement is supported virtually completely outside the work space, except, of course, for the end of the longitudinal guide holding the tool support. The work space thereby becomes free of all machine-tool parts which must not of necessity be in this region of the machine tool.

In accordance with another feature of the invention, the turning machine tool includes a front plate in front of which the work space is located and in back of which a gear transmission for the workpiece spindle is mounted, the gear transmission being received in a gear box carried by the front plate, the two transverse guides being disposed on the gear box or on supporting parts of the front plate adjacent the gear box in a manner for directly intercepting forces occurring in the work space between the workpiece spindle and the tool support.

Such a construction suggested for a turret lathe in the German Published Non-Prosecuted Application DT-OS No. 2,630,248 initially has the advantage that supporting parts of the housing of the machine-tool frame can actually be omitted except for the front plate. This improves the assemblability and accessibility of the drive members of the machine tool very considerably over heretofore known machine tools of this type. Since the workpiece spindle and the tool support-holding longitudinal shaft of the cross slide are furthermore, supported only in the region of the front plate, the overall structural length of the machine-tool according to the invention is relatively short. A decisive advantage is especially that the forces acting in the work space between the workpiece spindle and the tool support are intercepted immediately or directly between these two structural parts through the bearings therefor which are connected to one another on the rear of the front plate. Besides the disposition of the workpiece spindle and the cross slide and the associated structural components thereof, for example, the spindle and/or gear box, such means as frame or housing parts are therefore not required for intercepting forces transmitted during operation between the tool and the workpiece.

In accordance with a further feature of the invention, the cantilevered longitudinal guide and the guide means therefor are held as a two-armed lever in the round guide system, one of the transverse guides of the round guide system, namely the front transverse guide, forming a pivot axis for the two-armed lever, and the other, namely the rear transverse guide, providing protection for the front transverse guide against torsion. It must be taken into consideration, however, that when the slide is moved in lateral direction (relative to the direction of the workpiece spindle), forces act on the two transverse guides in directions different from one another, which exert bending moments on the transverse guides. Evidently, the largest deflection or bending occurs if the slide is exactly in the middle of the transverse guides. If the transverse guides are not strong enough, therefore, it can happen that the longitudinal guide may tend to become inclined in a vertical plane out of the longitudinal direction parallel to the workpiece spindle if it travels laterally in the round guide system. In order to avoid corresponding errors of the machine tool, the two transverse guides can be made so strong that errors which might occur are within permissible limits.

The problems connected with the possible bending or deflection of the transverse guide are solved in an elegant manner, in accordance with an added feature of the invention, wherein the one transverse guide forming the pivot axis for the two-armed lever is supported at both ends thereof and the other of the transverse guides is supported at only one end in cantilever manner, the cantilevered transverse guide comprising an elongated core and a sleeve concentrically surrounding the elongated core with clearance therebetween and being firmly connected to the free end of the elongated core. Although such a cantilevered transverse guide may be suggested by the German Published Prosecuted Application DT-AS No. 2,225,647, the disclosure therein concerns an index pin for indexing a longitudinally movable turret head of a turning machine. In the latter German publication, there is no explicit reference, however, to the application of a structural component of this type as the transverse guide of a cross slide.

The importance of the cantilevered transverse guide formed of a core with a sleeve disposed thereover resides in the fact that such a construction is especially stable against forces applied at the middle of the sleeve, while forces acting on one of the ends of the sleeve result in a given amount of bending of the transverse guide. The bending behavior of the cantilevered transverse guide constructed as described hereinbefore is thus exactly the opposite of that transverse guide which forms the lever axis and is supported at both ends of the length thereof.

If the cross slide according to the invention is therefore moved along the transverse guides from one end position to the other end position, the front transverse guide, which forms the lever axis, does suffer more deflection in the center than at the edges, but the situation with the cantilevered rear transverse guide is exactly the reverse. The latter is relatively soft at the two ends thereof and therefore hard to bend in the middle. With proper dimensioning of the planar-surface moments of inertia or angular impulses and corresponding matching of the two transverse guides, it can be possible that the longitudinal guide of the cross slide laterally traveling in the transverse guides can be moved parallel to itself in spite of a given amount of flexing of the two transverse guides. This parallel shifting of the longitudinal guide in the lateral direction does not, however, take place necessarily in one plane but, as a rule, along a curved path, the curvature of which corresponds to the bowing or bending of the front transverse guide forming the lever axis. Since, however, in turning operations, travel of the longitudinal guide or the tool in transverse direction (in the horizontal direction perpendicularly to the axis of the workpiece spindle) is used for performing facing work, it does not matter if the tool is moved reciprocatingly in a vertical plane, generally in fractions of a millimeter.

This added embodiment of the transverse guide system of the turning machine tool according to the invention is, first of all, an elegant means for eliminating the disadvantages resulting from the bending of the elements without eliminating the bending itself. To this is added unexpectedly another advantage which stems from the unilateral or one-sided i.e. cantilevered mounting or support of the rear transverse guide. The fact that the rear transverse guide is fastened only at one end thereof means that, while the cost is considerably reduced also over that for a transverse guide supported on both ends thereof, additional free space is, furthermore, created in the drive and transmission part of the machine tool. It is also of decisive advantage that the rear transverse guide can be mounted by its one end directly on the spindle casing or the gear box in such a manner that forces occurring in the work space between the tool and the workpiece, and which are transmitted through the longitudinal guide, on the one hand, and the spindle, on the other hand, can be intercepted in a direct manner.

In accordance with yet another feature of the invention, the cantilevered transverse guide has means for correcting the alignment of the longitudinal guide. These means, suggested in the German Published Non-Prosecuted Application DT-OS No. 2,526,855, are preferably that, in accordance with yet a further feature of the invention, in the rear transverse guide, which comprises an elongated core and a sleeve concentrically surrounding the elongated core, the sleeve is rotatable about an axis which is eccentric to the outer surface of the sleeve. By rotating the sleeve, if desired, the longitudinal guide can be brought exactly into a position parallel to the axis of the workpiece spindle. This means of correction is advantageous particularly in setting up the machine tool. If the requirements demanded of the machine tool according to the invention are unusually strict, however, it may be advantageous to provide the sleeve with especially automatically controlled drive means so that in case the alignment of the longitudinal guide deviates in operation from the desired parallelism with the longitudinal axis of the workpiece spindle, an appropriate dimensional correction is performable or is effected (for example, automatically).

For making the longitudinal guide and the workpiece spindle parallel when setting up the machine, it may further be advantageous if also the front transverse guide is made adjustable, for example, by supporting it in eccentric bushings. If mechanical stresses occur between the two transverse guides when the eccentric is operated, they can be eliminated if the cantilevered rear transverse guide is intentionally bent accordingly. This can easily be accomplished by placing tie rods on the free end of the core of the rear transverse guide, according to the German Published Non-Prosecuted Application DT-OS No. 2,446,127. Details regarding this feature are described hereinbelow.

According to another feature of the invention regarding the means associated with the cantilevered transverse guide for correcting the alignment of the longitudinal guide, the elongated core of the transverse guide can have a cross section deviating from a circle, particularly of oval or approximately rectangular cross section so that the planar surface moment of inertia or angular impulse of the transverse guide can be adjusted or changed by rotation of the core about the longitudinal axis thereof. As mentioned hereinbefore, the size of the planar surface moment of inertia or angular impulse of the core of the cantilevered transverse guide is, among other things, responsible for the fact that the longitudinal guide can be moved parallel to itself when it is moved laterally. If the parallel alignment with the longitudinal axis of the workpiece spindle is not yet exact, this exact parallel alignment can be accomplished by rotating the core and utilizing the anisotropic planar surface moment of inertia or angular impulse of the core.

Also, this dimensional correction will, as a rule, be necessary only in setting up the machine tool. If, however, relatively large lengthwise strokes are necessary in machining a workpiece, it may happen that, because the length of the lever arms of the longitudinal guide, supported as a two-arm lever in the transverse guides, varies considerably during operation, the longitudinal guide becomes deflected by excessive amounts at the ends of the working stroke thereof from the desired parallelism with the longitudinal axis of the workpiece spindle. In that case, the core of the cantilevered transverse guide can advantageously be provided with a drive. This drive serves to rotate the core about the longitudinal axis thereof as a function of the lengthwise position of the longitudinal guide so that the core has, for every position of the longitudinal guide, that moment of inertia which is just required to align the longitudinal guide parallel to the longitudinal axis of the workpiece spindle.

In accordance with a concomitant feature of the invention, instead of matching the moments of inertia or angular impulses of the transverse guides to the instantaneous load condition, the procedure may also be to counterbalance or calibrate the base weight of the traveling parts of the cross slide according to the invention, for example, by additionally supporting the guide means of the longitudinal guide, so that the ratio of the forces directed at the two transverse guides is independent of an additional load upon the free end of the longitudinal guide. Then, the ratio of the planar surface moments of inertia or angular inpulses require to be adjusted only once when the machine is set up.

If the longitudinal guide of the cross slide of the turning machine tool according to the invention is constructed as a round guide, it can carry, at the free end thereof, a tool turret which comprises various tools or sets of tools, which are assigned to definite positions of rotation. It is then necessary, among other things, to provide indexing for the respective positions of rotation; such indexing can be provided in the drive space of the machine tool, facing away from the work space. In addition, a drive for rotating or swiveling the turret can be connected in the drive space. Finally, a feed drive and means for controlling the feed and the rotation or swivel of the turret can be provided.

In contrast to currently known facing lathes with a cross slide disposed on a pedestal in the work space, two tool turrets supported in cross slides can be provided without difficulty. Since each turret can have four or more rotary or swiveled positions, the machine tool according to the invention is therefore superior to conventional machine tools of this general type also with respect to the number of available, firmly clamped tools.

Other features which are considered as characteristic for the invention are set forth in the appended claims.

Although the invention is illustrated and described herein as embodied in turning machine tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 4b is a loading diagram for the lower transverse guide of FIG. 4a;

Figure 1:
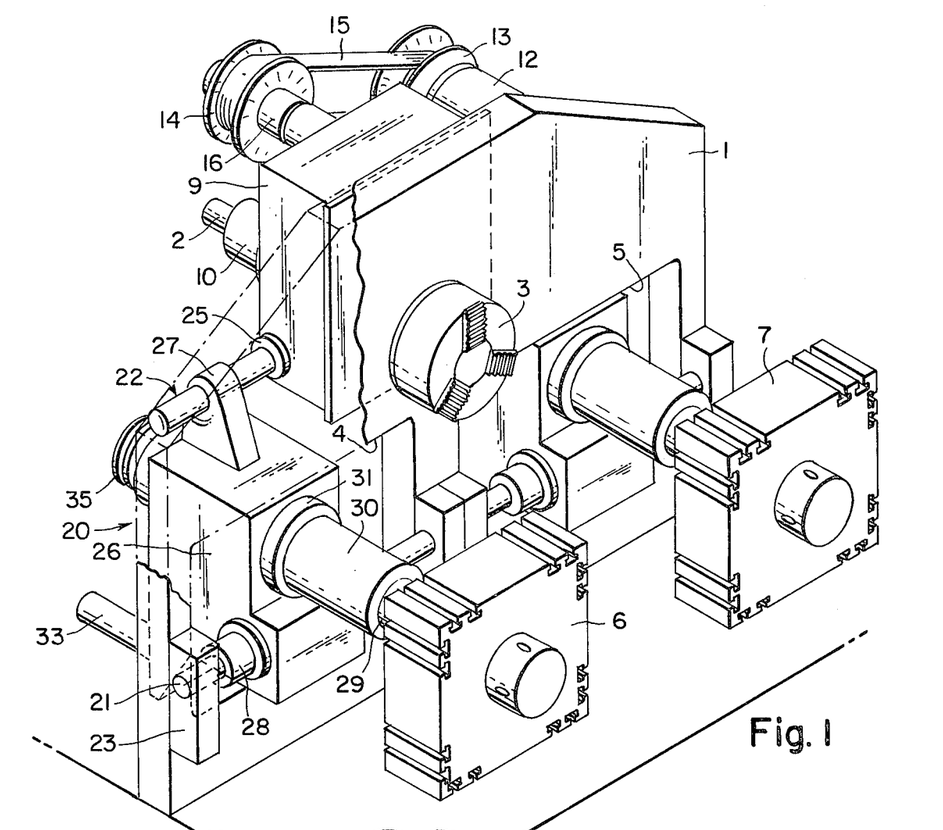
FIG. 1 is a perspective view of an embodiment of the turning machine tool constructed in accordance with the invention.
Figure 2:
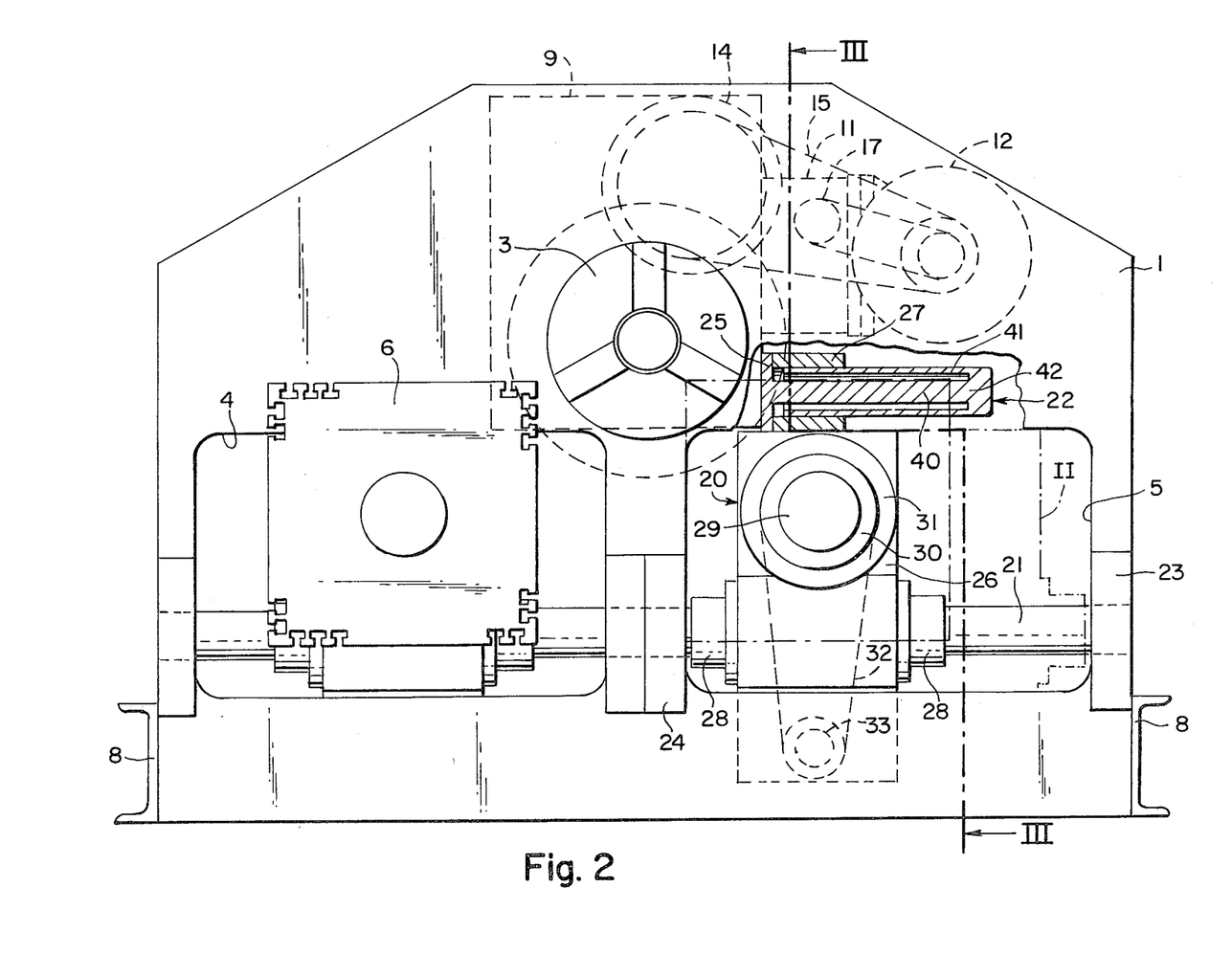
FIG. 2 is a front elevational view, partly in section, of FIG. 1.
Figure 3:
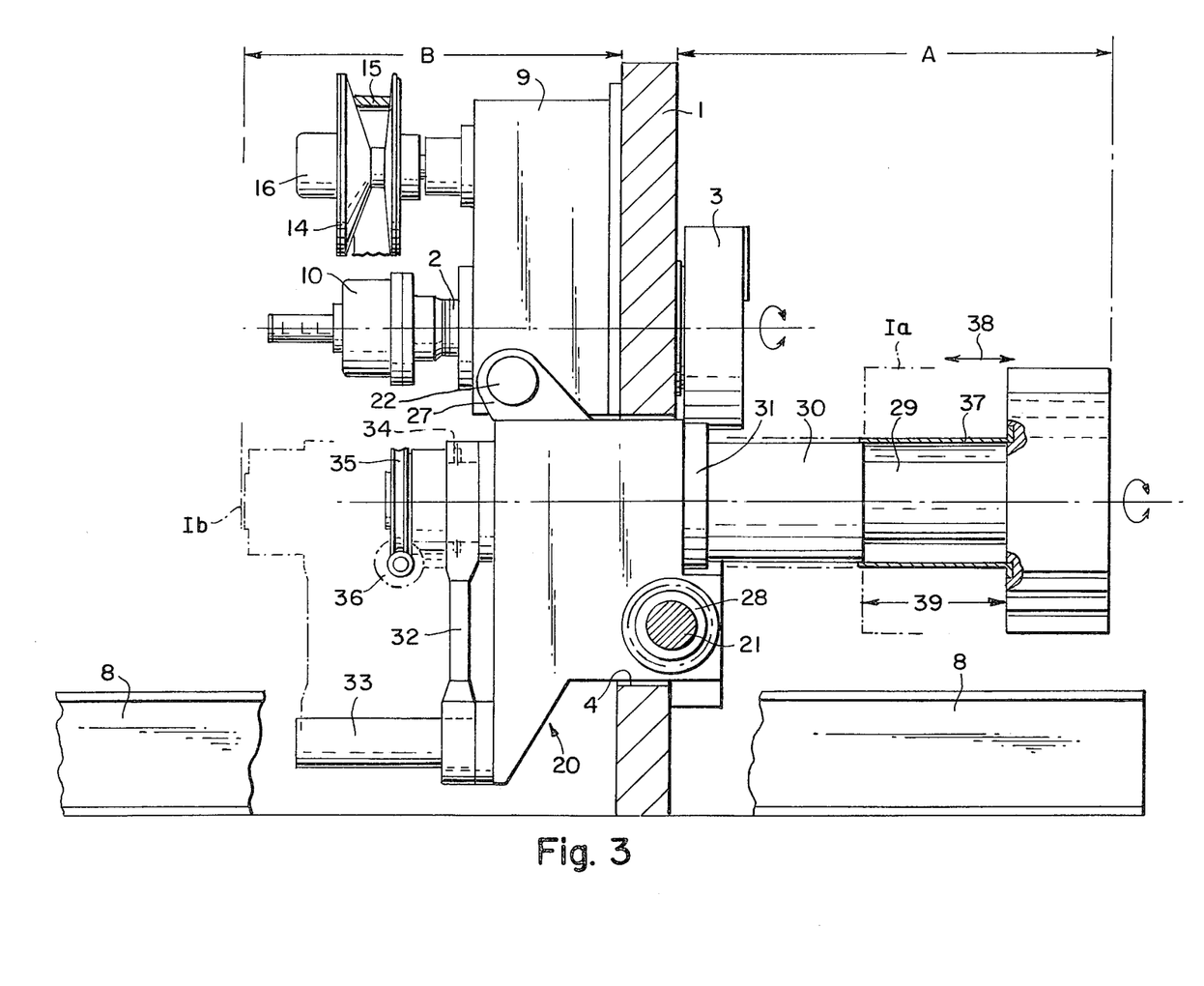
FIG. 3 is a cross-sectional view of FIG. 2 taken along the line III—III in direction of the arrows.

Referring now to the drawing and first, particularly to FIGS. 1 to 3 thereof, there is shown the turning machine tool according to the invention which includes a front plate 1 in which there are provided a non-illustrated bore hole through which a workpiece spindle 2 extends with a chuck 3 mounted thereon in a work space A (FIG. 3), and cutouts 4 and 5 through which cantilevered parts of the cross slide 20 according to the invention extend, the cantilevered parts projecting from a drive space B (FIG. 3) into the work space A and carrying tool holders or turrets 6 and 7. At the base thereof, the front plate 1 is supportable by laterally attached U-sections 8 in such a manner that the plate 1 cannot topple over. In the work space A, the U-sections 8 can be integrated with a non-illustrated water tray and in the drive space B with a non-illustrated trough for hydraulic oil.

The workpiece spindle 2 is supported in bearings in a spindle gear box 9 which is connected to the rear side of the front plate 1. In principle, the workpiece spindle 2 can also be supported in a housing separate from the gear box 9. A spindle transmission contained in the spindle (gear) box 9 is driven via a variable flat-belt drive by the main motor 12 of the machine tool, mounted on a motor bracket 11. The variable flat-belt drive is formed of a set of pulleys 13 which is disposed on the motor output shaft 12, and a set of pulleys 14, which is coupled to the pulley set 13 by means of a flat-belt 15 and is seated on the input shaft 16 of the variable drive. The variable flat-belt drive also includes a control motor or servomotor 17 which is associated with the set of pulleys 14.

In the illustrated embodiment of FIGS. 1 to 3, the turning machine tool has, including the casing or jacket thereof, a length in direction of the rotary axis of the workpiece spindle 2 of about 2,100 mm, a width of about 2,500 mm and a height of about 2,000 mm. The span of the workpiece spindle is approximately 700 mm. The drawing of FIGS. 1 to 3 is approximately to scale.

According to the invention, the most important feature thereof concerns the construction and support of the cross slides generally identified by the reference numeral 20 in FIGS. 1 to 3. Since the two cross slides according to the illustrated embodiment of FIGS. 1 to 3 are substantially identical, reference is made hereinafter only to one of them and it will be understood that such reference will be equally applicable to the other thereof. It should be noted that the machine can also be equipped with two workpiece spindles (double-spindle machine). In principle, nothing is changed thereby. It is very advantageous for the machine according to the invention, that it can have two tool holders 6 and 7 serving as tool turrets, and that the tool holders can be constructed as four- or more-sided turrets. The number of tools that can be installed is thereby very considerably increased or multiplied over conventional facing lathes.

The cross slide 20 can be driven laterally in two transverse guides 21 and 22 i.e. perpendicularly to the longitudinal direction of the axis of rotation of the workpiece spindle 2 in a horizontal plane. The transverse guide 21 is held at both longitudinal ends thereof in respective pillow or bearing blocks 23 and 24 firmly connected to the front plate 1. The transverse guide 22 is fastened in the position thereof only at one end by means of a collar 25, the latter being connected to the spindle gear box 9 (or, if applicable, to the housing of the spindle 2). It may be advantageous to move up the front transverse guide 21 together with the bearing blocks 23 and 24 thereof forward into the work space A as far as possible and to locate the rear transverse guide 22 in the drive space B as far away as possible from the front transverse guide in the horizontal direction. The lever arm of the longitudinal guide 29 of the cross slide 20 lying between the two transverse guides 21 and 22, the longitudinal guide 29 being supported as a two-arm lever on the transverse guides 21 and 22, is accordingly lengthened.

The cross slide 20 has a carriage 26 which can be driven laterally in the transverse guides 21 and 22 and can travel, on the one hand, with the guides 28 on the front transverse guide 21. The carriage 26 is thus supported both in the front transverse guide 21 below the spindle gear box 9 (or the spindle housing) on the front plate 1 (by means of the bearing blocks 23 and 24), as well as by the rear transverse guide 21 directly at the spindle (gear) box 9. The effect of this suspension is that forces acting in the work space A between a workpiece clamped in the chuck 3 and the tool holder 6 are intercepted directly between the cross slide 20 and the spindle (gear) box 9. A special support frame or a stabilizing housing is therefore also not required on the back of the front plate 1 in the turning machine tool according to the invention.

In the carriage 26 of the cross slide 20, the longitudinal guide 29 which, in the illustrated embodiment, is constructed as the turret shaft, is mounted so as to be able to travel parallel to the longitudinal direction of the axis of rotation of the workpiece spindle 2. The longitudinal guide 29 has an actuating or feed cylinder 30 for effecting longitudinal movement thereof, the feed cylinder 30 being supported by means of a collar 31 in the carriage 26. On the back of the longitudinal guide 29, an indexing device with an index arm 32 can be provided which extends over an index pin 33. The index pin 33 can, in principle, also be disposed above or beside the longitudinal guide 29. The space below the longitudinal guide 29 is then available for the possible installation of hydraulic equipment.

The index arm 32 is coupled, in the illustrated embodiment, to the longitudinal guide 29 by means of Hirth-type serrations (spur teeth or serrations which are engageable in swiveled or tilted position). With the construction of the longitudinal guide 29 as a turret shaft, a rotating drive 35 with a rotation motor 36 is furthermore provided. The latter can have, for example, an output gear which meshes with an input gear of the rotation drive 35. The rotation motor 36 and the rotation drive 35 are advantageously connected to the longitudinal guide 29 in such a way that they move along with the longitudinal guide 29, in accordance with the feed thereof.

In FIG. 3, the longitudinal guide 29 is shown moved to the righthand side so far that the tool holder 6 or the tool turret set on the end of the longitudinal guide 29 is at its maximum distance from the chuck 3. In order to prevent dirt from getting into the feed cylinder 30, in this position, the longitudinal guide 29 is surrounded by a protective cylinder 37. The tool holder 6 which can travel in direction of the arrow 38, can be moved toward the chuck 3 by a given stroke 39 to the location Ia shown in phantom. The parts at the rear end of the longitudinal guide 29 are similarly moved along therein to the position Ib thereof.

Figure 4A:
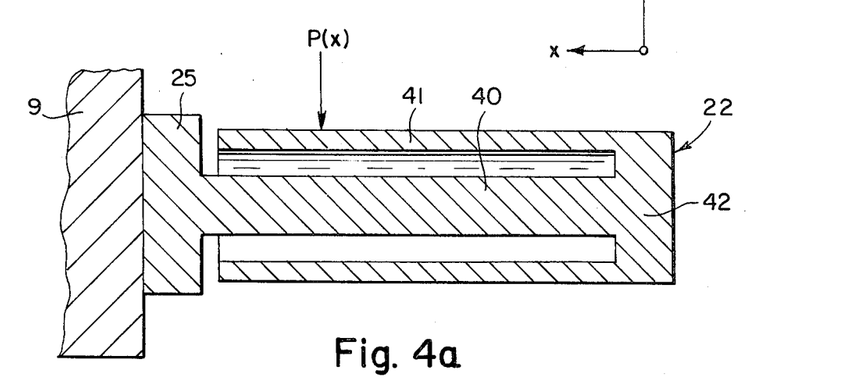
FIG. 4a is an enlarged sectional view of the lower transverse guide 22 of FIG. 2 supported on one side thereof i.e. cantilevered.

Especially in FIG. 2, a particularly advantageous embodiment of the rear transverse guide 22 is shown in cross section. In FIG. 4a, this transverse guide 22 is shown in an enlarged cross-sectional view. As mentioned hereinbefore, this transverse guide 22 is supported only at one end thereof i.e. is cantilevered by means of the collar 25 at the spindle gear box 9. The eye 27 of the carriage 26 runs laterally movable on the transverse guide 22. The carriage 26 is, furthermore, laterally movably supported by the guide 28 thereof on the front transverse guide 21. When moved laterally, the carriage 26, as shown in FIG. 2, travels from the position thereof shown by solid lines to the position II thereof shown in phantom.

The rear transverse guide 22 is formed, in the embodiment according to FIGS. 2 and 4, of a longitudinal core 40, which is connected by means of the shoulder 25 firmly to the spindle gear box 9, and of a sleeve 41 which surrounds the longitudinal core 40 concentrically with clearance and is firmly connected only to the free end 42 of the longitudinal core 40. If a force P should then be applied at any point of the sleeve 41, the force would then act through the sleeve 41 upon the free end 42 of the longitudinal core 40. This means roughly that the deflection or bending of the rear transverse guide 22 must always be the same, regardless of the point of application of the force upon the length of the sleeve 41, because a force exerted upon the sleeve 41 is indirectly applied always to the free end 42 of the longitudinal core 40. Upon closer analysis of these relationships, it is found, however, that in addition to the action of the force or weight P, a moment M is also exerted upon the longitudinal core 40. It can be demonstrated by calculation and measurement that the force P and the moment M connected therewith have opposite effects upon the deflection of the transverse guide 22. Details with respect thereto are disclosed in the German Published Non-Prosecuted Application DT-OS No. 2,613,302. Theory and practice have shown that a transverse guide 22 with a longitudinal core 40 and a sleeve 41 disposed around it, in accordance with the embodiment of FIGS. 2 and 4, experiences a distinctly greater deflection when a force is applied at the end of the sleeve length 41 than if the force is applied about in the middle of the sleeve length 41.

In the illustration according to FIG. 4a, it was assumed that a force P(x) is applied at any point x of the sleeve 41. The coordinate x is counted positive from the free end 42 of the transverse guide 22 in direction toward the collar 25 thereof. In addition, a further Cartesian coordinate y is introduced which is counted positive in upward direction from the end 42. The effect of the force P(x) results in a deflection of the transverse guide 22 by an amount y(x), as shown in the plot diagram in FIG. 4b. This deflection is composed of a deflection $y_P$ which stems directly from the force P. However, as mentioned hereinbefore, the force P also produces a moment M on the longitudinal core 40, which results in a deflection $y_M$. It must finally be assumed that the sleeve 41 is flexible to a certain extent. The corresponding deflection is designated $y_A$. The total deflection y(x) of the transverse guide 22 due to a force P(x) applied at a point x is therefore $$y(x) = y_P + y_M + y_A$$

This leads to the following formula:

$$y(x) = (P/E\ I_K)\ (-l^2 x + l^3/3 + l x^2) + (P x^3/3\ E\ I_H) \qquad (1)$$

Figure 4B:
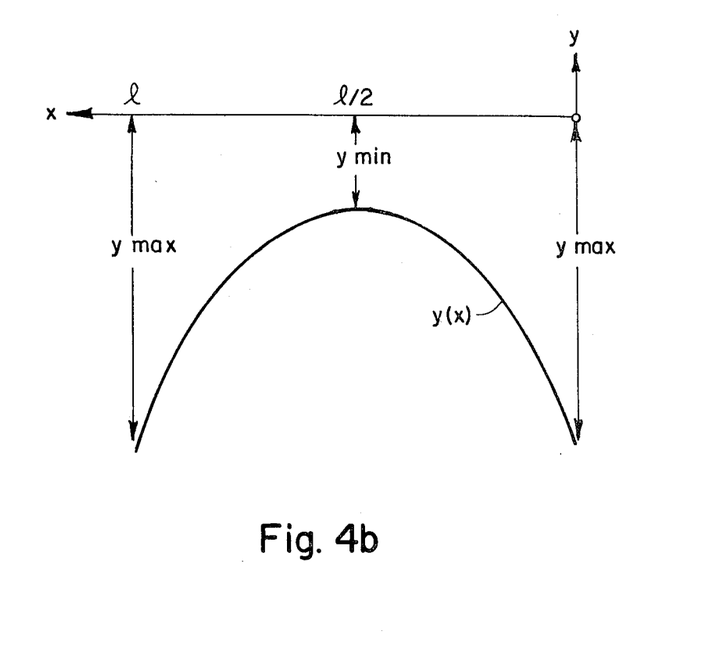

(note Dubbel, Taschenbuch für den Maschinenbau (Handbook for Machine Design), 13th Ed., vol. 1, page 386 ff. load cases 1 and 8). In Equation (1) hereinabove, E is the modulus of elasticity, $I_K$ the planar surface moment of inertia or angular impulse of the longitudinal core, $I_H$ the planar surface moment of inertia or angular impulse of the sleeve and l = the length of the cantilevered longitudinal core 40. The shape of y(x) is also shown in FIG. 4b. As is readily apparent, the magnitude of y(x) is a minimum for x = l/2, and y(x) attains a maximum at x = 0 and x = l. In other words, the transverse guide 22 in the embodiment according to FIG. 4 gives away or yields more for forces which are applied at one of the ends of the length thereof than for forces which are applied in the middle thereof.

Figure 5:
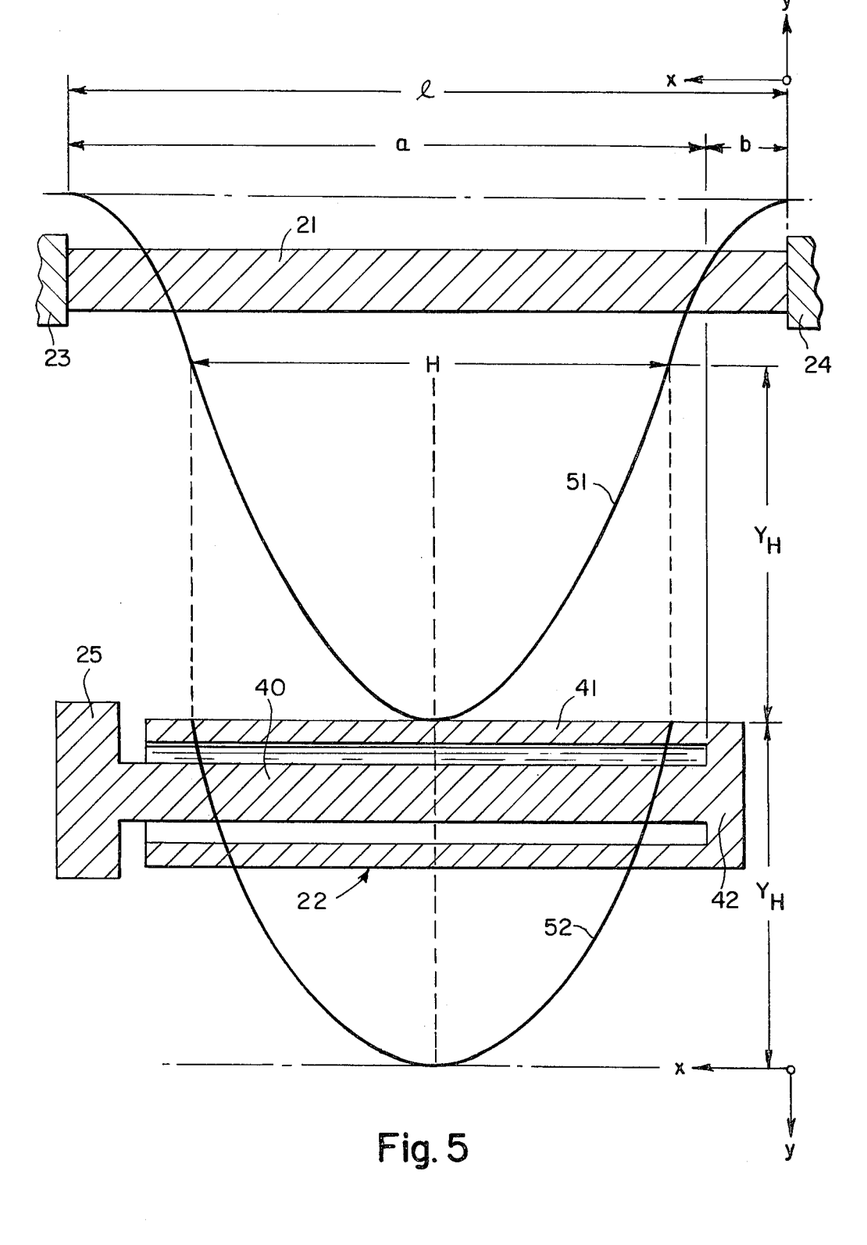
FIG. 5 is a sectional view of the transverse guides of the cross slide of the turning machine tool of FIG. 1, with bending moment curves superimposed thereon.

In FIG. 5, the deflection curves of the front transverse guide 21, which is supported at both ends thereof, and of the cantilevered rear transverse guide 22 are plotted in superimposed relationship. Curve 51 refers to the symbolically sketched front transverse guide 21. Curve 52 refers to the similarly illustrated, rear transverse guide 22. The curve 51 corresponds to the equation $$y(x) = (P_F a^3 x^3)/(3 E\ I_F l^3_F) \qquad (2)$$

(note Dubbel, Taschenbuch für den Maschinenbau, 13th Ed., vol. 1, page 386, load case No. 7). In Equation (2) hereinabove, $P_F$ is the force acting on the front guide 21 at the point x, E is the modulus of elasticity, $I_F$ the planar surface moment of inertia or angular impulse of the front guide 21, $l_F$ the length of the front guide 21, and $a + x = l_F$. While the curve 51 of FIG. 5 corresponds to Equation (2) for the front transverse guide 21, the curve 52 of FIG. 5 corresponds to Equation (1) for the rear transverse guide 22.

Curves 51 and 52 of FIG. 5 are drawn so that they approximately agree in the middle region thereof. The agreement is especially good in the zone between the inversion points $x_W = \frac{1}{4} l_F$ of the curve 51. It is therefore advisable when constructing the machine according to the invention to make the front transverse guide 21 about 40% longer than the rear transverse guide 22. This construction presents no particular difficulties, however, since the carriage 26 rests with two guides 28 on the front transverse guide 21 anyway, but is coupled to the rear transverse guide 22 only by means of one eye 27. Since the front transverse guide 21, as the axis of the aforementioned two-arm lever, must absorb a considerably larger force $P_F$ than the rear transverse guide 22 anyway, this teaching as to lengthening the front transverse guide 21 relative to the rear transverse guide 22 is compatible with the construction or layout, especially since the front transverse guide 21 is located partly below the spindle (gear) box 9 and, therefore, more space is available for it than for the rear transverse guide 22.

If, on the front transverse guide 21, only that region is used which lies approximately between the inversion points on the corresponding deflection curve and is identified in FIG. 5 by the reference character H (= maximum stroke of lateral travel of the cross slide according to the invention), then a maximum deflection $Y_H$ of the front transverse guide 21 is obtained for this region. In practice, the curve 52, which corresponds to the deflection of the rear transverse guide 22, must now be matched so that it agrees as exactly as possible with the region H of the curve 51. This matching is accomplished through the choice of the moments of inertia or angular impulses $I_K$ and $I_H$ of the longitudinal core 40 and the sleeve 41 of the rear transverse guide 22. The values $I_K$ and $I_H$ can be determined from the deflection curves of the rear transverse guide 22 by setting first $y(x) = y(0) = 0$ and, in addition $y(\frac{1}{2} l) = Y_H$. The curve 52 of FIG. 5 was determined in this manner.

In comparing the curves 51 and 52 of FIG. 5, it should be taken into consideration that, while in both cases the x-coordinate increases in value from right to left, the y-coordinate for the curve 51 increases vertically upwardly and for curve 52, increases vertically downwardly. When superimposing the two curves 51 and 52, nearly a straight line is therefore obtained at least in the region H, which lies approximately between the inversion points of the curve 51. This means that the longitudinal guide 29 of the cross slide 20 which, during operation of the machine tool, can travel on the transverse guides 21 and 22, can be shifted parallel to itself, as desired.

Figure 6:
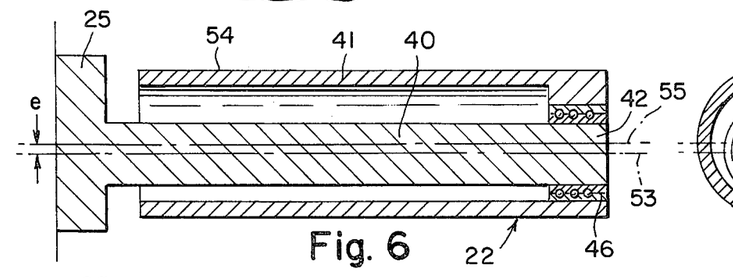
FIGS. 6 and 7 are sectional views of different embodiments of the rear transverse guide of the turning machine tool with different means for dimensional correction.
Figure 6A:
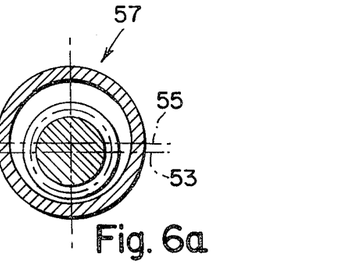
FIGS. 6a and 7a are respective cross-sectional views thereof.

It is advantageous if the cantilevered rear transverse guide 22 is provided with means for correcting the alignment of the longitudinal guide 29. These means may be that the sleeve 41 of the rear transverse guide 22 is rotatable, as shown in FIG. 6, about an axis 55 which is eccentric to the longitudinal axis 53 of the outer surface 54 of the sleeve 41. The eccentricity is identified by the reference character e. The rotatability of the sleeve 41 can be accomplished by providing a ball bearing 46 between the free end 42 of the longitudinal core 40 and the sleeve 41. A cross section 57 of the construction shown in FIG. 6 is shown in FIG. 6a. Further details and embodiments of this type of dimensional correction by rotating the sleeve 57 relative to the longitudinal core 40 are known from the German Published Non-Prosecuted Application DT-OS No. 2,526,855. It is readily apparent that by rotating the sleeve 41 relative to the longitudinal core 40, the longitudinal guide 29 (FIG. 3) can be swiveled or swung by a given (small) amount e about the front transverse guide 21.

When setting up the machine, it will further often be necessary to align the front transverse guide 21 exactly perpendicularly to the longitudinal direction of the workpiece spindle 2. This adjustment is accomplished in a very simple manner if rotatable eccentric bushings are inserted in at least one of the pillow or bearing blocks 23 and 24 of the front transverse guide 21. In conjunction with the eccentric support of the sleeve 41 of the rear transverse guide 22, a dimensional correction becomes possible thereby, by which the transverse guides 21 and 22 can be aligned exactly perpendicularly and the longitudinal guide 29 exactly parallel to the longitudinal direction of the workpiece spindle 2.

If, with the dimensional correction described hereinabove, mechanical stresses should occur between the two transverse guides 21 and 22 because the transverse guides move relative to each other due to the operation of the eccentric, it may be advantageous to bend the longitudinal core 40 intentionally in accordance with the teachings of the German Published Non-Prosecuted DT-OS No. 2,446,127 in such a manner that the stresses are cancelled. For this purpose, it is only necessary to provide tapped bores on both sides of the core axis, with screws serving as tie rods, in the free end 42 of the longitudinal core 40 in the plane defined by the two parallel transverse guides 21 and 22. By tightening one or the other of these screws, the free end 42 of the longitudinal core 40 can then be bent easily toward the one or the other side. It is readily apparent that, in this manner, undesired mechanical stresses between the two transverse guides 21 and 22 can easily be eliminated.

The matching of the two curves 51 and 52 of FIG. 5 is accomplished, as mentioned hereinbefore, among other things, by matching the moment of inertia of the longitudinal core 40 of the rear transverse guide 22. It may be advantageous to make this planar surface moment of inertia or angular impulse $I_K$ adjustable to a given extent (by small amounts). This is achieved, for example, if the rear transverse guide 22 has an anisotropic planar surface moment of inertia or angular impulse in radial direction and is supported rotatable about the longitudinal axis thereof.

Figure 7:
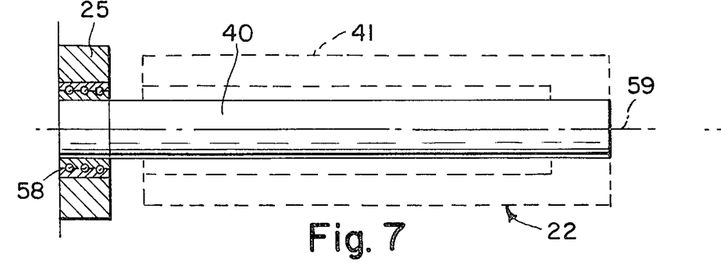
Figure 7A:
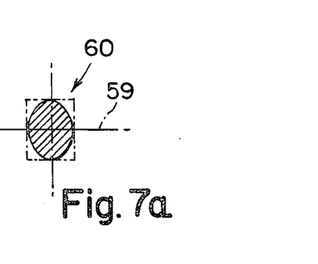

FIG. 7 shows an embodiment in this regard. The longitudinal core 40 is disposed rotatable about the longitudinal axis 59 in a ball bearings 58 inserted into the collar 25. The longitudinal core 40 has oval cross section 60 shown in FIG. 7a. However, the cross section 60 can also be of rectangular shape. It may even be sufficient if the originally cylindrical longitudinal core 40 is flattened on two opposite longitudinal sides. By turning the longitudinal core 40, its planar surface moment of inertia or angular impulse then changed and, thereby, that of the entire transverse guide 22. In FIG. 7, the sleeve 41 is indicated only in broken lines in order to show that the sleeve is disregarded in this case i.e. the adjustability of the planar surface moment of inertia or angular impulse of the longitudinal core 40 and the functions of the sleeve 41 of the rear transverse guide 22 exist and can be utilized side-by-side and independently of each other.

If the tool holder 6 or 7 of FIGS. 1 to 3, constructed as a turret, is caused to travel parallel to the longitudinal direction of the workpiece spindle 2 by operating the longitudinal guide 29 serving as the turret shaft, the ratio of the lengths of the lever arms on both sides of the front transverse guide 21, which is constructed as a lever fulcrum or pivot, changes. It can then happen that the tool holder 6 is not moved on the desired straight line parallel to the longitudinal direction of the workpiece spindle 2. This difficulty can be overcome if the planar surface moment of inertia or angular impulse of the rear transverse guide 22 is varied, for example, by rotating the longitudinal core 40, as explained hereinabove, automatically and simultaneously with the longitudinal stroke of the tool holder 6 in such a manner that the stiffness of the rear transvers guide 22 is continuously matched in accordance with the instantaneous length ratio of the aforementioned lever arms in order to make the longitudinal guide 29 and the longitudinal axis of the workpiece spindle 2 parallel.

However, one can instead also balance the basic weight, measured through an engaged tool steel, of the movable parts of the cross slide arrangement according to the invention right from the start, so that the force acting on the front transverse guide 21 is equal to the absolute value of the sum of the forces of the forces acting on the rear transverse guide 22 and at the free end of the longitudinal guide 29. What is achieved thereby is that the ratio of the forces acting on the transverse guides 21 and 22 is always constant if the force action on the tool holder 6 is increased, for example, when a tool engages a workpiece.

There is claimed:

1. Turning machine tool comprising a workpiece spindle, a cantilevered longitudinal guide adjacent said workpiece spindle and movable parallel to the rotary axis thereof, at least one tool support mounted on the free end of said cantilevered longitudinal guide and being movable in a horizontal plane perpendicularly to said rotary axis of said workpiece spindle within a work space for the turning machine tool, guide means for said cantilevered longitudinal guide, and a round guide system comprising two transverse guides movable perpendicularly to said rotary axis of said workpiece spindle, said cantilevered longitudinal guide being supported outside said work space through the intermediary of said guide means in said round guide system.

2. Turning machine tool according to claim 1 including a front plate in front of which said work space is located and in back of which a gear transmission for said workpiece spindle is mounted, said gear transmission being received in a gear box carried by said front plate, said two transverse guides being disposed on said gear box in a manner for directly intercepting forces occurring in said work space between said workpiece spindle and said tool support.

3. Turning machine tool according to claim 1 including a front plate in front of which said work space is located and in back of which a gear transmission for said workpiece spindle is mounted, said gear transmission being received in a gear box carried by said front plate, said two transverse guides being mounted on supporting parts of said front plate adjacent said gear box in a manner for directly intercepting forces occurring in said work space between said workpiece spindle and said tool support.

4. Turning machine tool according to claim 1 wherein said cantilevered longitudinal guide and said guide means therefor are held as a two-armed lever in said round guide system, one of said transverse guides of said round guide system forming a pivot axis for said two-armed lever.

5. Turning machine tool according to claim 4 wherein said one transverse guide forming said pivot axis for said two-armed lever is supported at both ends thereof and the other of said transverse guides is supported at only one end in cantilever manner, said cantilevered transverse guide comprising an elongated core and a sleeve concentrically surrounding said elongated core with clearance therebetween and being firmly connected to the free end of said elongated core.

6. Turning machine tool according to claim 5 wherein said cantilevered transverse guide has means for correcting misalignment of said longitudinal guide.

7. Turning machine tool according to claim 5 wherein said sleeve concentrically surrounding said elongated core is rotatable about an axis eccentric to the outer surface of said sleeve.

8. Turning machine tool according to claim 5 wherein said cantilevered transverse guide is rotatable about the longitudinal axis of said elongated core and has an anisotropic planar-surface moment of inertia or angular impulse in radial direction.

9. Turning machine tool according to claim 8 wherein said elongated core of said cantilevered transverse guide has a cross-section other than that of a circular cross section so that by rotating said elongated core about said longitudinal axis thereof, the planar-surface moment of inertia or angular impulse of said cantilevered transverse guide is adjustable.

10. Turning machine tool according to claim 8 wherein the cross-section of said elongated core is oval.

11. Turning machine tool according to claim 8 wherein the cross-section of said elongated core is substantially rectangular.

12. Turning machine tool according to claim 1 wherein said longitudinal guide is formed as a tool-turret shaft rotatable about the longitudinal axis thereof.

13. Turning machine tool according to claim 1 including a cross slide having traveling parts carrying said cantilevered longitudinal guide and supported by said two transverse guides, and means for counterbalancing or taring the base weight of said traveling parts so that a ratio of forces applied to said two transverse guides is independent of an additional loading on the free end of said cantilevered longitudinal guide.

14. Turning machine tool according to claim 13 wherein said counterbalancing means comprise means for additionally supporting said guide means of said longitudinal guide.

* * * * *